United States Patent
Harrington

(10) Patent No.: US 8,482,810 B2
(45) Date of Patent: Jul. 9, 2013

(54) SYSTEM AND METHOD FOR FACSIMILE COMMUNICATION OF NON-FACSIMILE-COMMUNICATION-PROTOCOL/NON-FACSIMILE-IMAGE DATA

(75) Inventor: Steven J. Harrington, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 654 days.

(21) Appl. No.: 12/136,322

(22) Filed: Jun. 10, 2008

(65) Prior Publication Data

US 2009/0303548 A1    Dec. 10, 2009

(51) Int. Cl.
H04N 1/00 (2006.01)
H04N 1/46 (2006.01)
H04N 1/40 (2006.01)
G06F 3/12 (2006.01)

(52) U.S. Cl.
USPC .......... 358/407; 358/537; 358/3.28; 358/1.15

(58) Field of Classification Search
None
See application file for complete search history.

(56) References Cited

U.S. PATENT DOCUMENTS

| | | | |
|---|---|---|---|
| 5,905,801 A | 5/1999 | Serinken | |
| 2003/0144876 A1 | 7/2003 | Kosinski et al. | |
| 2005/0057778 A1 * | 3/2005 | Morikawa et al. | 358/296 |
| 2006/0229915 A1 | 10/2006 | Kosinski et al. | |
| 2007/0002371 A1 * | 1/2007 | Ohira | 358/1.15 |
| 2007/0008570 A1 * | 1/2007 | Okamoto et al. | 358/1.14 |
| 2007/0024935 A1 * | 2/2007 | Yamamoto | 358/537 |
| 2007/0188775 A1 * | 8/2007 | Minamino | 358/1.6 |
| 2007/0199992 A1 * | 8/2007 | Manheim | 235/462.01 |
| 2009/0244638 A1 * | 10/2009 | Evevsky | 358/3.28 |
| 2009/0257075 A1 * | 10/2009 | Izumisawa | 358/1.13 |

\* cited by examiner

*Primary Examiner* — Vincent Rudolph
(74) *Attorney, Agent, or Firm* — Michael J. Nickerson; Basch & Nickerson LLP

(57) ABSTRACT

A system and method transmit and receive information through a telephony based communication channel by scanning a hardcopy image to convert the hardcopy image into an electronic image and adding non-facsimile-communication-protocol/non-facsimile-image digital data to an electronic image to be transmitted by a telephony based communication circuit. Non-facsimile-communication-protocol/non-facsimile-image digital data is detected within an electronic image received from another facsimile system transmitting the electronic image based upon a telephony based communication protocol. Data received from another facsimile system transmitting the data based upon a telephony based communication protocol is directed, through a network based communication circuit, to a network based processing system, in response to detection of non-facsimile-communication-protocol/non-facsimile-image digital data within the data received from another facsimile system transmitting the data based upon a telephony based communication protocol.

20 Claims, 2 Drawing Sheets

SYSTEM AND METHOD FOR FACSIMILE COMMUNICATION OF NON-FACSIMILE-COMMUNICATION-PROTOCOL/NON-FACSIMILE-IMAGE DATA

BACKGROUND

The use of facsimile machines is wide spread. The widespread use of facsimile machines has resulted in a general acceptance and understanding of their use. One such use of facsimile machines is to transmit the content of physical documents and notes.

A conventional facsimile machine is illustrated in FIG. 1. As illustrated in FIG. 1, a facsimile machine includes a scanner 102 under direction of a central control unit 104. The scanner 102 accepts documents to be faxed and coverts the documents to a digital form at a resolution required for the FAX transmission. The central control unit 104 may store the documents or scan the documents as the documents are needed for transmission.

A FAX modem 106, interfaced to the public switched telephone network 108 (PSTN), when in transmission mode, accepts a data stream from the central control unit 104 and handles transmission of digital images and any protocol and communication tasks.

When the FAX machine is in reception mode, the FAX modem 106 recognizes an incoming FAX request, negotiates the communication protocol, and receives digital images which are sent to the central control unit 104. The central control unit 104 sends the images to an attached printer 112 where the images are printed.

There is also a user interface 110 that directs the functions of the central control unit 104. The user interface 110 may include facilities for a user to enter a phone number, select a FAX resolution option, and/or other similar functions.

Facsimile machines have also been implemented that are part of a device that performs several other functions. These so-called multifunction devices, or "all-in-ones," incorporate features that enable the printer 108 and scanner 102 to be used in a stand alone mode. The conventional multifunction device usually includes some sort of computer interface 114, typically a USB type of connection.

Such a conventional multifunction device allows an attached computer to develop a document to be faxed directly from a word processing application and use the interfaced facsimile machine to perform the transmission function. Similarly the attached computer may use either the printer 112 or the scanner 102 as if the printer 112 and the scanner 102 are independent devices.

Another feature which has been added to a conventional facsimile machine is fax-back. Fax-back processes are typically used to retrieve information using facsimile transmissions. A request for information is faxed to the source and a response to the request is faxed back to the requestor. Often the request form is annotated with the response and used for the reply. The forms can include machine readable image content such as bar codes to aid in connecting electronic systems to the fax process.

Facsimile transmissions have been used because of the perceived security. Moreover, facsimile transmissions have been used because facsimile transmission is the only communication channel universally available. However, some means for migration to more direct communication between electronic systems is needed.

For example, a medical drug management company may employ facsimile transmissions as part of their work process. In this case, a patient can phone in a prescription request to the drug management company, and the drug management company, in turn, will contact a local pharmacy in order to fill the request. The drug management company will forward the prescription request to the pharmacy by faxing a form, and the pharmacy replies to the request by filling out the form and faxing it back.

Facsimile transmission is used in this process because of security and privacy requirements and because facsimile transmission is supported by essentially all pharmacies.

In order to partially automate the process, the drug company may include a barcode on the faxed form that identifies the request. When the form is faxed back to the drug management company, the barcode can be scanned and used to identify the request which is being answered. It is noted that data glyphs may be used instead of barcodes.

It is noted that the conventional facsimile process is not particularly compatible with various modern electronic systems. More specifically, the conventional facsimile process does not provide an adequate platform to enable a direct transfer of non-facsimile-communication-protocol/non-facsimile-image digital data between electronic systems, while maintaining the conventional facsimile capability of transmitting and receiving facsimile communication protocol and image data.

Therefore, it is desirable to extend the current work process to support interaction of electronic systems when electronic systems are available at both ends of the communication channel, while maintaining compatibility with other security and privacy requirements so that a direct transfer of non-facsimile-communication-protocol/non-facsimile-image digital data between electronic systems may be realizable while maintaining the conventional facsimile capability of transmitting and receiving facsimile communication protocol and image data.

BRIEF DESCRIPTION OF THE DRAWING

The drawings are only for purposes of illustrating various embodiments and are not to be construed as limiting, wherein.

DETAILED DESCRIPTION

Figure 1:
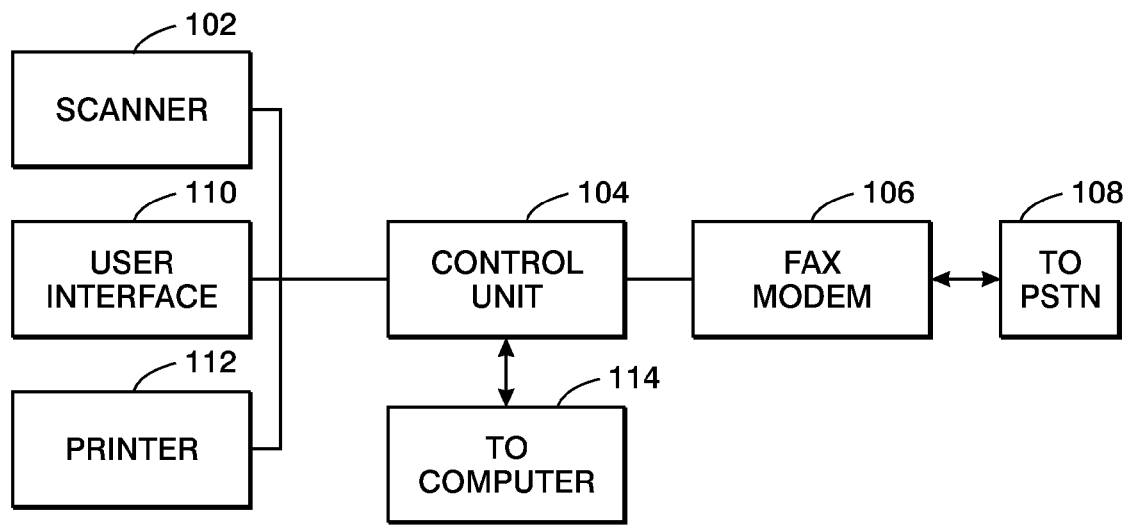
FIG. 1 illustrates a conventional FAX machine.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts could be properly illustrated.

As noted above, it is desirable to extend the current work process to support interaction of electronic systems when electronic systems are available at both ends of the communication channel, while maintaining compatibility with other security and privacy requirements so that a direct transfer of non-facsimile-communication-protocol/non-facsimile-image digital data between electronic systems may be realizable while maintaining the conventional facsimile capability of transmitting and receiving facsimile communication protocol and image data.

Non-facsimile-communication-protocol/non-facsimile-image digital data is multi-bit digital data representing non-facsimile-image information wherein facsimile-image information is data representing a facsimile of the image or document actually being transmitted, as well as, any image data representing origination information; such as information the user selects to be placed in the image data header to indicate to the recipient the identity of the sender and/or identity of the sending phone number; and/or time stamp information.

Moreover, non-facsimile-communication-protocol/non-facsimile-image digital data may be reproduced by a non-featured facsimile machine, but the non-facsimile-communication-protocol/non-facsimile-image digital data will be rendered in a manner that does not produce intelligible human-readable information to the recipient.

Non-facsimile-communication-protocol/non-facsimile-image digital data is also multi-bit digital data representing non-facsimile-communication-protocol information wherein facsimile-communication-protocol information is signals or instructions to create/facilitate a communication channel between a transmitting device and a receiving device.

In summary, non-facsimile-communication-protocol/non-facsimile-image digital data is machine readable data that is transmitted in addition to conventional facsimile data wherein if the non-facsimile-communication-protocol/non-facsimile-image digital data is reproduced by the receiving facsimile machine, the non-facsimile-communication-protocol/non-facsimile-image digital data does not produce intelligible human-readable information as the receiving facsimile machine would render the concurrently transmitted conventional facsimile data.

One approach to extend the current work process to support interaction of electronic systems when electronic systems are available at both ends of the communication channel, while maintaining compatibility with other security and privacy requirements so that a direct transfer of non-facsimile-communication-protocol/non-facsimile-image digital data between electronic systems may be realizable while maintaining the conventional facsimile capability of transmitting and receiving facsimile communication protocol and image data is to augment the communication channel with additional features to enable a direct transfer of non-facsimile-communication-protocol/non-facsimile-image digital data between electronic systems, while allowing the communication channel to be backward compatible with present work processes.

More specifically, by pre-defining some portion of the fax transmission (such as the very beginning) and replace the image bits with bits of raw electronic data, a direct transfer of non-facsimile-communication-protocol/non-facsimile-image digital data between electronic systems, while allowing the communication channel to be backward compatible with present work processes can be realized.

The non-facsimile-communication-protocol/non-facsimile-image digital data could be losslessly compressed and transmitted as part of the fax image. When received and printed, the non-facsimile-communication-protocol/non-facsimile-image digital data would appear as a band of random pixel dots that would be fairly innocuous to the viewer. The non-facsimile-communication-protocol/non-facsimile-image digital data could include some code or signature that identifies the sender of the non-facsimile-communication-protocol/non-facsimile-image digital data and possibly a checksum to assure its error-free reception.

When the fax is received by a device that is capable of recognizing and extracting the non-facsimile-communication-protocol/non-facsimile-image digital data, the non-facsimile-communication-protocol/non-facsimile-image digital data is checked to see if the non-facsimile-communication-protocol/non-facsimile-image digital data has the identifying code signaling the presence of embedded data. If the data is found, the non-facsimile-communication-protocol/non-facsimile-image digital data is extracted for use by electronic systems. The fax image may or may not be printed, depending on the application. If the non-facsimile-communication-protocol/non-facsimile-image digital data is not detected, then the fax is printed normally.

By inserting the extra data bits in the image part of the fax transmission, there is no effect of the augmentation on the normal fax protocol. The new data, non-facsimile-communication-protocol/non-facsimile-image digital data, is inserted into the image part where is either recognized by a suitably augmented fax receiver or else ignored and simply printed as image data. If the amount of extra data is limited, the impact on the image is limited and not readily visible to a non-augmented fax printout.

An example of an augmentation of a fax channel, as it might be employed in the fax-back process, is described below.

In the example, a requestor constructs a form for a request. This form might include bar codes or data glyphs. The form will also have embedded non-facsimile-communication-protocol/non-facsimile-image digital data identifying the form, the requester, and/or the request. The request form is faxed to a receiver. If the receiver is a conventional fax device, it is printed, filled out, and faxed back.

If however, the device is capable of receiving the non-facsimile-communication-protocol/non-facsimile-image digital data, the non-facsimile-communication-protocol/non-facsimile-image digital data is extracted. In this scenario, the fax image might not be printed. Instead, an electronic version of the form might be generated.

The client receiving the request would respond by using the electronic form. When completed, the clients system would generate a fax image and fax it back to the requestor.

The returned fax image could have the data provided by the electronic form in a human readable form (and possibly additional bar codes or data glyphs), or it could have the data encoded as non-facsimile-communication-protocol/non-facsimile-image digital data included as part of the fax image, or both.

When the requestor receives the response, it can either process it as an image using current mechanisms, or if capable, it can detect the non-facsimile-communication-protocol/non-facsimile-image digital data, confirm that the non-facsimile-communication-protocol/non-facsimile-image digital data includes the response, and process it electronically.

Thus, the system supports electronic processing when both ends of the communication channel support electronic processing, but falls back on conventional fax processing when either end is cannot handle the embedded the non-facsimile-communication-protocol/non-facsimile-image digital data.

The embedded non-facsimile-communication-protocol/non-facsimile-image digital data can be inserted into the fax data stream in a number of ways. If the form is constructed electronically, as is possible through many common computer systems, the embedded the non-facsimile-communication-protocol/non-facsimile-image digital data can be inserted by the computer program that constructs the fax image.

Alternatively, the embedded the non-facsimile-communication-protocol/non-facsimile-image digital data can be inserted by means of a user interface on the augmented fax machine which might be a simple keypad that would allow for insertion of simple numerical codes. The keypad might include customized keys to add information specific to a particular business need.

Addition of the non-facsimile-communication-protocol/non-facsimile-image digital data would be done at a specific place in the FAX data stream so that any receiving device will know where to look for it and also to ensure that the inserted the non-facsimile-communication-protocol/non-facsimile-image digital data is not confused with normal FAX data.

For example, the inserted non-facsimile-communication-protocol/non-facsimile-image digital data could replace the first few lines of image data in the normal FAX stream. This would correspond to the first few scanlines of a normal FAX image and if printed on a non-enhanced FAX machine would not be particularly noticeable. For example, at a resolution of 200 dpi, the first 1/10" of a letter-sized FAX page would allow for the inclusion of over 32,000 bits of data.

To further ensure that the inserted the non-facsimile-communication-protocol/non-facsimile-image digital data is properly identified, the data stream can include specific formatting information including such things as an initial header identifying the enhanced the non-facsimile-communication-protocol/non-facsimile-image digital data; a checksum to ensure that data stream is properly formatted and other similar techniques that are well known to those skilled in the art.

Figure 2:
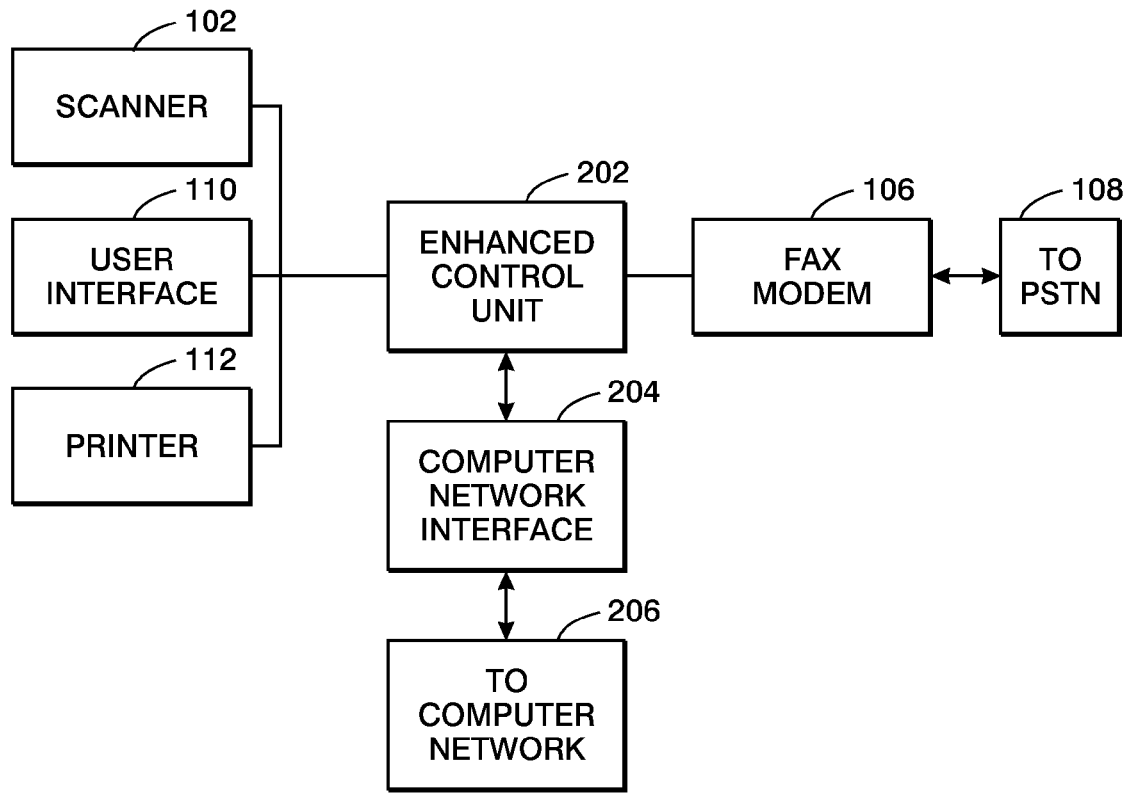
FIG. 2 illustrates an enhanced FAX machine.

As illustrated in FIG. 2, a facsimile machine includes a scanner 102 under direction of a central control unit 202. The scanner 102 accepts documents to be faxed and coverts the documents to a digital form at a resolution required for the FAX transmission. The central control unit 202 may store the documents or scan the documents as the documents are needed for transmission.

A FAX modem 106, interfaced to the public switched telephone network 108 (PSTN), when in transmission mode, accepts a data stream from the central control unit 202 and handles transmission of digital images and any protocol and communication tasks.

When the FAX machine is in reception mode, the FAX modem 106 recognizes an incoming FAX request, negotiates the communication protocol, and receives digital images which are sent to the central control unit 202. The central control unit 202 sends the images to an attached printer 112 where the images are printed.

There is also a user interface 110 that directs the functions of the central control unit 202. The user interface 110 may include facilities for a user to enter a phone number, select a FAX resolution option, and/or other similar functions.

Facsimile machines have also been implemented that are part of a device that performs several other functions. These so-called multifunction devices, or "all-in-ones," incorporate features that enable the printer 108 and scanner 102 to be used in a stand alone mode. The conventional multifunction device usually includes some sort of computer network interface 204 that enables connection to a network 206.

The central control unit 202 can act both in transmit and reception modes. In transmit mode, the central control unit 202 accepts requests from the computer network, for example, from workstations on the network. These requests can include not only FAX documents to be transmitted but also additional information, such as the non-facsimile-communication-protocol/non-facsimile-image digital data, to be encoded in the FAX document.

The central control unit 202 can embed this non-facsimile-communication-protocol/non-facsimile-image digital data within a specific place in the document, for example, at the very beginning of a page image. This non-facsimile-communication-protocol/non-facsimile-image digital data information contains data or requests for action on the part of the receiving entity.

If the receiving entity does not have the enhanced functions described herein, the non-facsimile-communication-protocol/non-facsimile-image digital data is printed as part of the normal FAX process. Since the amount of non-facsimile-communication-protocol/non-facsimile-image digital data is small, for a non-enhanced FAX machine, the non-facsimile-communication-protocol/non-facsimile-image digital data will be barely visible and not have any significant impact on a normal FAX document.

However, if the receiving machine has the enhanced capabilities described herein, the receiving machine can act on the non-facsimile-communication-protocol/non-facsimile-image digital data in ways that will be described below.

In reception mode, the central control unit 202 receives FAX documents via the normal FAX interface via the PSTN 108. If the received documents do not contain any non-facsimile-communication-protocol/non-facsimile-image digital data, the received FAX document is printed as normal.

However, if the central control unit 202 detects the presence of the non-facsimile-communication-protocol/non-facsimile-image digital data, the central control unit 202 examines the non-facsimile-communication-protocol/non-facsimile-image digital data to determine further action.

Further actions can include several functions. For example, the non-facsimile-communication-protocol/non-facsimile-image digital data may include a request for a document from a set of stored documents. Such FAX-back processes are presently used, wherein a FAX request can be formatted in such a way that some sort of OCR process of the received document can identify the desired document, retrieve it, format it as a FAX document, and transmit it back to the requestor.

The enhanced device described here could replace the OCR function, since the non-facsimile-communication-protocol/non-facsimile-image digital data would identify the desired document. The non-facsimile-communication-protocol/non-facsimile-image digital data could also include instructions on how to return the document, for example, the non-facsimile-communication-protocol/non-facsimile-image digital data could request a FAX copy or the non-facsimile-communication-protocol/non-facsimile-image digital data could request transmission via other electronic means, for example, e-mail. In this case, the non-facsimile-communication-protocol/non-facsimile-image digital data would include a specific electronic address to which to send the document.

Such an enhanced FAX-back process could eliminate any need to print a FAX document at either end of the process, thus resulting in a savings in paper.

Another possibility for the enhanced FAX process described here is in the pharmaceutical industry.

A drug management company may employ facsimile transmissions as part of their work process. In these cases, a patient can phone in a prescription request to the drug management company, and the drug management company will then contact a local pharmacy in order to fill the request. The drug management company will forward the prescription request to the pharmacy by faxing a form, and the pharmacy replies by filling out the form and faxing it back.

Fax is used in this process because of privacy and security requirements and it is supported by essentially all pharmacies.

In order to partially automate the process, the drug management company may include a barcode on the faxed form that identifies the request. When the form is faxed back to the drug management company, the barcode can be scanned and used to identify the request which is being answered.

The enhanced FAX machine is aimed at extending this process to support interaction of electronic systems when electronic systems are available at both ends of the communication channel. The approach is to augment the FAX channel to provide backward compatibility with today's work process and to address privacy and security requirements. The enhancement of the fax channel described herein might be employed in the fax-back process as follows.

For example, the requestor constructs a form for a request. This form might include bar codes or data glyphs. The form will also have embedded non-facsimile-communication-protocol/non-facsimile-image digital data identifying the form, the requester, and/or the request. The request form is faxed to a receiver.

If the receiver is a conventional fax device, the form is printed, filled out, and faxed back.

If however, the device is capable of receiving the non-facsimile-communication-protocol/non-facsimile-image digital data, the data is extracted and the fax image might not be printed. Instead, an electronic version of the form might be generated.

The client receiving the request would respond by using the electronic form. When completed, the client's system would generate a fax image and fax it back to the requestor. The returned fax image could have the data provided by the electronic form in a human readable form (and possibly additional bar codes or data glyphs), or it could have the data encoded as non-facsimile-communication-protocol/non-facsimile-image digital data included as part of the fax image, or both.

When the requestor receives the response, it can either process it as an image using current mechanisms, or if capable, it can detect the non-facsimile-communication-protocol/non-facsimile-image digital data, confirm that it includes the response, and process it electronically.

Thus, the system supports electronic processing when both ends of the channel support it, but falls back on conventional fax processing when either end is cannot handle the embedded data.

Figure 3:
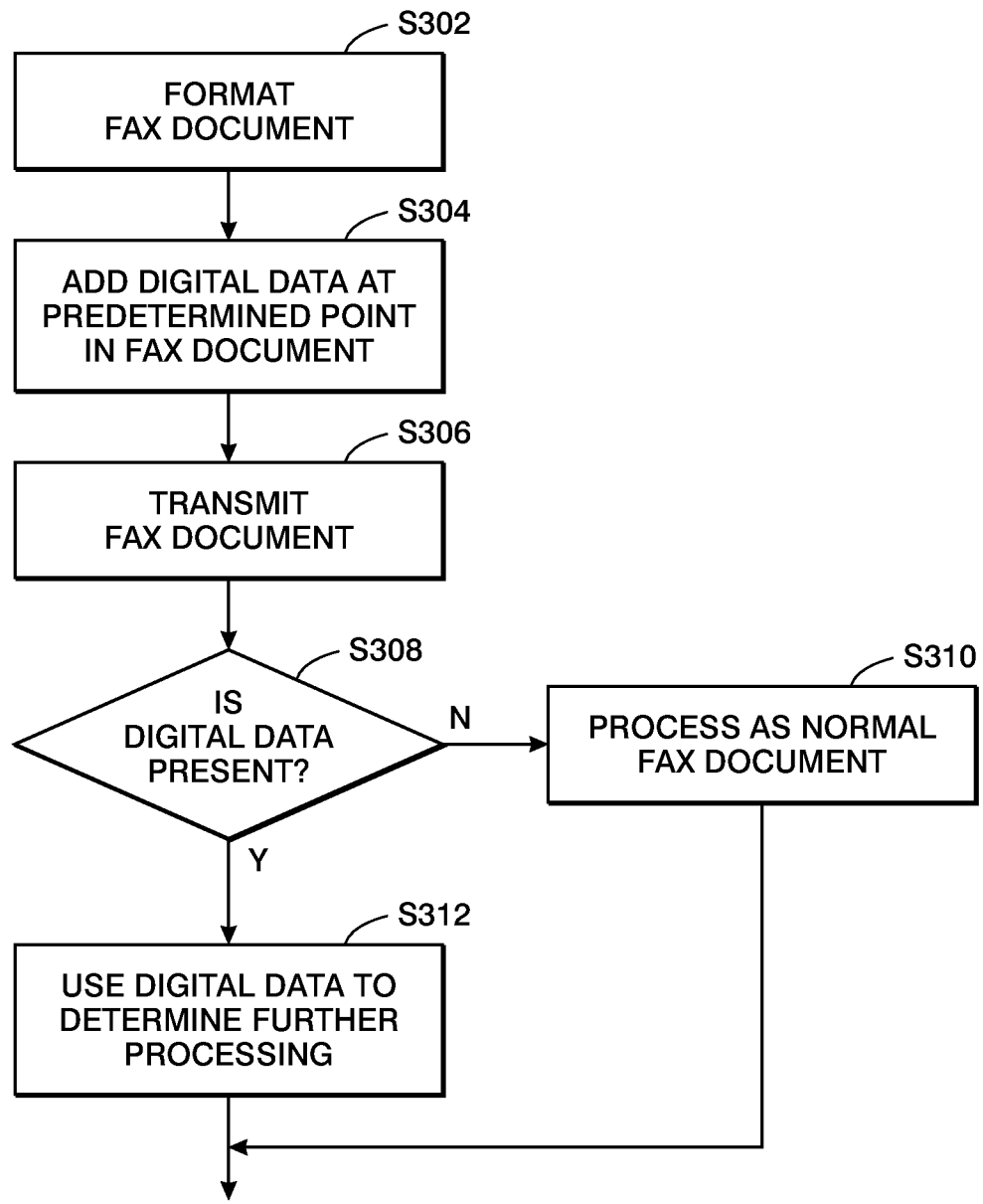
FIG. 3 illustrates a flowchart showing enhanced FAX data communication.

FIG. 3 shows a process by which enhanced FAX communication can occur. At step S302, a FAX document is formed. This can be via scanning of a paper document or by electronic means.

At step S304, non-facsimile-communication-protocol/non-facsimile-image digital data is added to the document in a predefined location in the FAX data stream. For example, the non-facsimile-communication-protocol/non-facsimile-image digital data might be inserted at the very start of the page image. The non-facsimile-communication-protocol/non-facsimile-image digital data could include some code or signature that identifies it and possibly a checksum to assure its error-free reception. The enhanced FAX document is now transmitted to the intended recipient at step S306.

Subsequent steps S308-S312 occur at the receiving end of the FAX communication.

At step S308, the incoming FAX data stream is examined to see if any non-facsimile-communication-protocol/non-facsimile-image digital data is present. This can be detected by examining the predefined location in the data stream to see if the proper code or signature is present and that the data stream checksum is correct. If the non-facsimile-communication-protocol/non-facsimile-image digital data is not detected, processing continues at step S310 where normal FAX processing occurs.

However, if the non-facsimile-communication-protocol/non-facsimile-image digital data is detected, processing continues at step S312 where the non-facsimile-communication-protocol/non-facsimile-image digital data is examined to determine what further processing occurs. This further processing can include such things as document retrieval and transmission, or database retrieval or entry.

In summary, a facsimile system or method includes a scanning device to convert a hardcopy image into an electronic image; a print engine to create a hardcopy document from electronic data; a user interface to enable a user to input instructions and information; a controller, operatively connected to the scanning device, print engine and user interface, to control operations of the scanning device, print engine and user interface; a telephony based communication circuit, operatively connected to the controller, to provide a telephony based communication channel; and a network based communication circuit, operatively connected to the controller, to provide a network based communication channel.

The controller enables addition of non-facsimile-communication-protocol/non-facsimile-image digital data to an electronic image to be transmitted by the telephony based communication circuit. The controller enables detection of non-facsimile-communication-protocol/non-facsimile-image digital data within an electronic image received from another facsimile system transmitting the electronic image based upon a telephony based communication protocol.

The controller directs, by utilizing the network based communication circuit, data received from another facsimile system transmitting the data based upon a telephony based communication protocol to a network based processing system, in response to detection of non-facsimile-communication-protocol/non-facsimile-image digital data within the data received from another facsimile system transmitting the data based upon a telephony based communication protocol. The controller directs data received from another facsimile system transmitting the data based upon a telephony based communication protocol to the print engine, in response to an absence of non-facsimile-communication-protocol/non-facsimile-image digital data within the data received from another facsimile system transmitting the data based upon a telephony based communication protocol. The print engine produces a hardcopy document based upon data directed thereto by the controller.

The controller prevents a directing of data received from the other facsimile system transmitting the data based upon a telephony based communication protocol to the print engine, in response to detection of non-facsimile-communication-protocol/non-facsimile-image digital data within the data received from the other facsimile system transmitting the data based upon a telephony based communication protocol.

The controller receives retrieved data from the network based processing system in response to the directed data received from another facsimile system transmitting the data based upon a telephony based communication protocol, and the controller causes the telephony based communication circuit to send the retrieved data back to the other facsimile system transmitting the directed data based upon a telephony based communication protocol.

The controller enables addition of verification data to an electronic image to be transmitted by the telephony based communication circuit, the addition of security data to an electronic image to be transmitted by the telephony based communication circuit, and/or the addition of authentication data to an electronic image to be transmitted by the telephony based communication circuit.

The non-facsimile-communication-protocol/non-facsimile-image digital data may be compressed before being added to the electronic image to be transmitted by the telephony based communication circuit. The non-facsimile-communication-protocol/non-facsimile-image digital data may be reproduced at another facsimile system, not having a capability of detecting non-facsimile-communication-protocol/non-facsimile-image digital data, as a band of random pixel dots. The controller enables addition of error-checking data to an electronic image to be transmitted by the telephony based communication circuit.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A facsimile system comprising:
   a scanning device to convert a hardcopy image into an electronic image;
   a print engine to create a hardcopy document from electronic data;
   a user interface to enable a user to input instructions and information;
   a controller, operatively connected to said scanning device, print engine and user interface, to control operations of said scanning device, print engine and user interface;
   a telephony based communication circuit, operatively connected to said controller, to provide a telephony based communication channel; and
   a network based communication circuit, operatively connected to said controller, to provide a network based communication channel;
   said controller converting electronic image data into facsimile-image digital data, the facsimile-image digital data being in a facsimile transmission ready format;
   said controller enabling addition of non-facsimile-communication-protocol/non-facsimile-image digital data facsimile-image digital data to be transmitted by said telephony based communication circuit, said non-facsimile-communication-protocol/non-facsimile-image digital data being renderable as dots with no specific purpose;
   said controller enabling detection of non-facsimile-communication-protocol/non-facsimile-image digital data within facsimile-image digital data received from another facsimile system transmitting the facsimile-image digital data based upon a telephony based communication protocol;
   said controller directing, by utilizing said network based communication circuit, the facsimile-image digital data received from another facsimile system transmitting the facsimile-image digital data based upon a telephony based communication protocol to a network based processing system, in response to detection of non-facsimile-communication-protocol/non-facsimile-image digital data within the facsimile-image digital data received from another facsimile system transmitting the facsimile-image digital data based upon a telephony based communication protocol;
   said controller directing the facsimile-image digital data received from another facsimile system transmitting the facsimile-image digital data based upon a telephony based communication protocol to said print engine, in response to an absence of non-facsimile-communication-protocol/non-facsimile-image digital data within the facsimile-image digital data received from another facsimile system transmitting the facsimile-image digital data based upon a telephony based communication protocol;
   said print engine producing a hardcopy document based upon the facsimile-image digital data directed thereto by said controller.

2. The system as claimed in claim 1, wherein said controller prevents a directing of the facsimile-image digital data received from the other facsimile system transmitting the facsimile-image digital data based upon a telephony based communication protocol to said print engine, in response to detection of non-facsimile-communication-protocol/non-facsimile-image digital data within the facsimile-image digital data received from the other facsimile system transmitting the facsimile-image digital data based upon a telephony based communication protocol.

3. The system as claimed in claim 1, wherein said controller receives retrieved data from the network based processing system in response to the directed facsimile-image digital data received from another facsimile system transmitting the facsimile-image digital data based upon a telephony based communication protocol;
   said controller causes said telephony based communication circuit to send the retrieved data back to the other facsimile system transmitting the directed facsimile-image digital data based upon a telephony based communication protocol.

4. The system as claimed in claim 1, wherein said controller enables addition of verification data to the facsimile-image digital data to be transmitted by said telephony based communication circuit.

5. The system as claimed in claim 1, wherein said controller enables addition of security data to the facsimile-image digital data to be transmitted by said telephony based communication circuit.

6. The system as claimed in claim 1, wherein said controller enables addition of authentication data to the facsimile-image digital data to be transmitted by said telephony based communication circuit.

7. The system as claimed in claim 1, wherein the non-facsimile-communication-protocol/non-facsimile-image digital data is compressed before being added to the facsimile-image digital data to be transmitted by said telephony based communication circuit.

8. The system as claimed in claim 1, wherein the non-facsimile-communication-protocol/non-facsimile-image digital data is losslessly compressed before being added to the facsimile-image digital data to be transmitted by said telephony based communication circuit.

9. The system as claimed in claim 1, wherein the non-facsimile-communication-protocol/non-facsimile-image digital data is reproduced at another facsimile system, not having a capability of detecting non-facsimile-communication-protocol/non-facsimile-image digital data, as a band of random pixel dots.

10. The system as claimed in claim 1, wherein said controller enables addition of error-checking data to the facsimile-image digital data to be transmitted by said telephony based communication circuit.

11. A method of transmitting and receiving information through a telephony based communication channel, comprising:
    scanning a hardcopy image to convert the hardcopy image into an electronic image;

converting electronic image data into facsimile-image digital data, the facsimile-image digital data being in a facsimile transmission ready format;

adding non-facsimile-communication-protocol/non-facsimile-image digital data to facsimile-image digital data to be transmitted by a telephony based communication circuit, the non-facsimile-communication-protocol/non-facsimile-image digital data being renderable as dots with no specific purpose;

detecting non-facsimile-communication-protocol/non-facsimile-image digital data within facsimile-image digital data received from another facsimile system transmitting the facsimile-image digital data based upon a telephony based communication protocol;

directing, through a network based communication circuit, the facsimile-image digital data received from another facsimile system transmitting the facsimile-image digital data based upon a telephony based communication protocol to a network based processing system, in response to detection of non-facsimile-communication-protocol/non-facsimile-image digital data within the facsimile-image digital data received from another facsimile system transmitting the facsimile-image digital data based upon a telephony based communication protocol;

directing the facsimile-image digital data received from another facsimile system transmitting the facsimile-image digital data based upon a telephony based communication protocol to said print engine, in response to an absence of non-facsimile-communication-protocol/non-facsimile-image digital data within the facsimile-image digital data received from another facsimile system transmitting the facsimile-image digital data based upon a telephony based communication protocol; and producing, at the print engine, a hardcopy document based upon the facsimile-image digital data directed thereto.

12. The method as claimed in claim 11, further comprising:
preventing a directing of the facsimile-image digital data received from the other facsimile system transmitting the facsimile-image digital data based upon a telephony based communication protocol to the print engine, in response to detection of non-facsimile-communication-protocol/non-facsimile-image digital data within the facsimile-image digital data received from the other facsimile system transmitting the facsimile-image digital data based upon a telephony based communication protocol.

13. The method as claimed in claim 11, further comprising:
receiving retrieved data from the network based processing system in response to the directed facsimile-image digital data received from the other facsimile system transmitting the facsimile-image digital data based upon a telephony based communication protocol; and causing the retrieved data to be sent back to the other facsimile system transmitting the directed facsimile-image digital data based upon a telephony based communication protocol.

14. The method as claimed in claim 11, further comprising:
adding verification data to the facsimile-image digital data to be transmitted based upon a telephony based communication protocol.

15. The method as claimed in claim 11, further comprising:
adding security data to the facsimile-image digital data to be transmitted based upon a telephony based communication protocol.

16. The method as claimed in claim 11, further comprising:
adding authentication data to the facsimile-image digital data to be transmitted based upon a telephony based communication protocol.

17. The method as claimed in claim 11, wherein the non-facsimile-communication-protocol/non-facsimile-image digital data is compressed before being added to the facsimile-image digital data to be transmitted based upon a telephony based communication protocol.

18. The method as claimed in claim 11, wherein the non-facsimile-communication-protocol/non-facsimile-image digital data is losslessly compressed before being added to the facsimile-image digital data to be transmitted based upon a telephony based communication protocol.

19. The method as claimed in claim 11, wherein the non-facsimile-communication-protocol/non-facsimile-image digital data is reproduced at another facsimile system, not having a capability of detecting non-facsimile-communication-protocol/non-facsimile-image digital data, as a band of random pixel dots.

20. The method as claimed in claim 11, further comprising:
adding error-checking data to the facsimile-image digital data to be transmitted based upon a telephony based communication protocol.

* * * * *